US009589705B2

(12) United States Patent
Verhagen

(10) Patent No.: US 9,589,705 B2
(45) Date of Patent: Mar. 7, 2017

(54) COOLED POWER CONNECTOR WITH SHUT OFF VALVE, INDUCTION HEATING SYSTEM, AND CABLE FOR USE WITH CONNECTOR

(71) Applicant: Illinois Tool Works Inc., Glenview, IL (US)

(72) Inventor: Paul Verhagen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 579 days.

(21) Appl. No.: 14/054,174

(22) Filed: Oct. 15, 2013

(65) Prior Publication Data

US 2014/0106587 A1   Apr. 17, 2014

Related U.S. Application Data

(60) Provisional application No. 61/715,089, filed on Oct. 17, 2012.

(51) Int. Cl.
*H05B 6/42* (2006.01)
*H05B 6/04* (2006.01)
(Continued)

(52) U.S. Cl.
CPC .............. *H01B 7/423* (2013.01); *F16L 25/01* (2013.01); *F16L 37/30* (2013.01); *H01R 13/005* (2013.01)

(58) Field of Classification Search
CPC    F16L 37/30; F16L 25/01; F16L 37/03; H01B 7/423; H01R 13/005; H05B 6/42; H05B 6/14; H05B 6/101

USPC ....... 219/632, 660, 663, 667, 121.5, 121.51, 219/136, 137.9; 439/194, 527, 180, 559, 439/565, 188, 296, 372; 285/47, 123.15, 285/904; 266/96, 97
See application file for complete search history.

(56) References Cited

U.S. PATENT DOCUMENTS

| 4,700,743 | A | 10/1987 | L'Henaff et al. |
| 7,696,458 | B2 | 4/2010 | Thomas et al. |

(Continued)

FOREIGN PATENT DOCUMENTS

| CN | 201267021 Y | 7/2009 |
| DE | 2333620 A1 | 1/1975 |

(Continued)

OTHER PUBLICATIONS

PCT International Search Report and Written Opinion, PCT/US2013/065293, Feb. 27, 2014, 13 pages.

(Continued)

*Primary Examiner* — Quang Van
(74) *Attorney, Agent, or Firm* — Quarles & Brady LLP

(57) ABSTRACT

A connector for simultaneously connecting and disconnecting electrical and fluid paths includes an internal valve which activates fluid flow when the two sides of the connector are connected together to provide an electrical connection and deactivates the fluid flow when the connectors are disconnected. The connector bodies can be constructed of metal or other conductive materials providing an electrical connection, and can include holes or apertures to provide fluid paths through the connector bodies. Valves can be included in both mating connectors to prevent or allow fluid flow from both sides of the flow path.

19 Claims, 4 Drawing Sheets

(51) Int. Cl.
*F16L 25/01* (2006.01)
*H01B 7/42* (2006.01)
*F16L 37/30* (2006.01)
*H01R 13/00* (2006.01)

(56) References Cited

U.S. PATENT DOCUMENTS

| | | | |
|---|---|---|---|
| 8,038,931 B1 | 10/2011 | Thomas et al. | |
| 8,517,749 B2* | 8/2013 | Marshall | F16L 37/32 |
| | | | 285/123.15 |
| 2006/0289493 A1* | 12/2006 | Thomas | H05B 6/101 |
| | | | 219/660 |
| 2009/0123221 A1 | 5/2009 | Marshall | |

FOREIGN PATENT DOCUMENTS

| | | |
|---|---|---|
| DE | 102007041110 A1 | 3/2009 |
| DE | 102009042568 A1 | 3/2011 |
| EP | 0800234 A1 | 10/1997 |

OTHER PUBLICATIONS

Canadian Intellectual Property Office, Official Action, Application No. 2,887,704, May 17, 2016.

\* cited by examiner

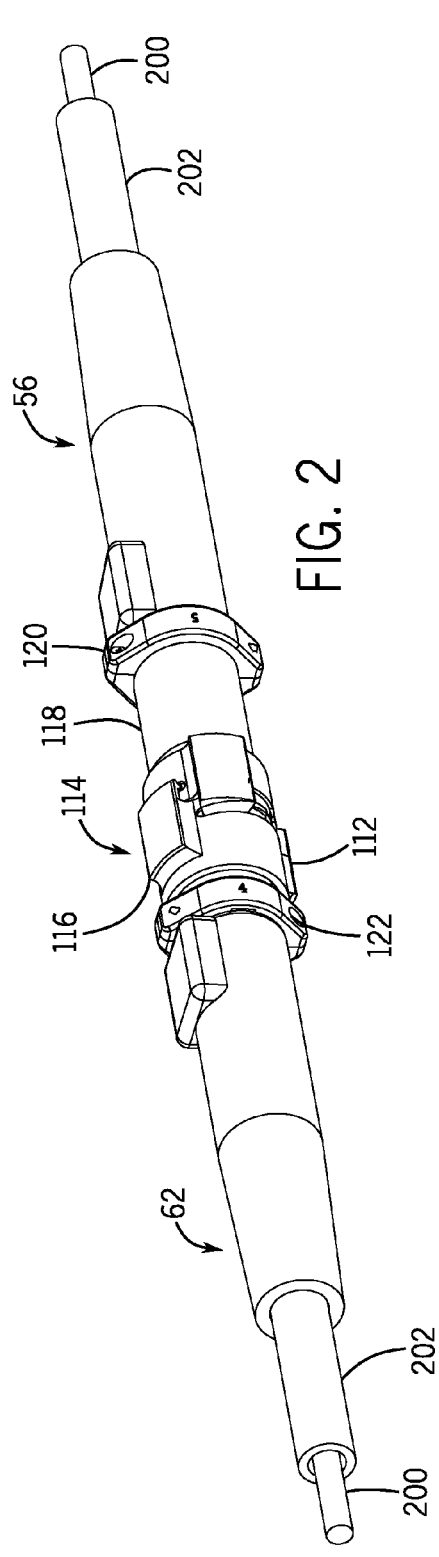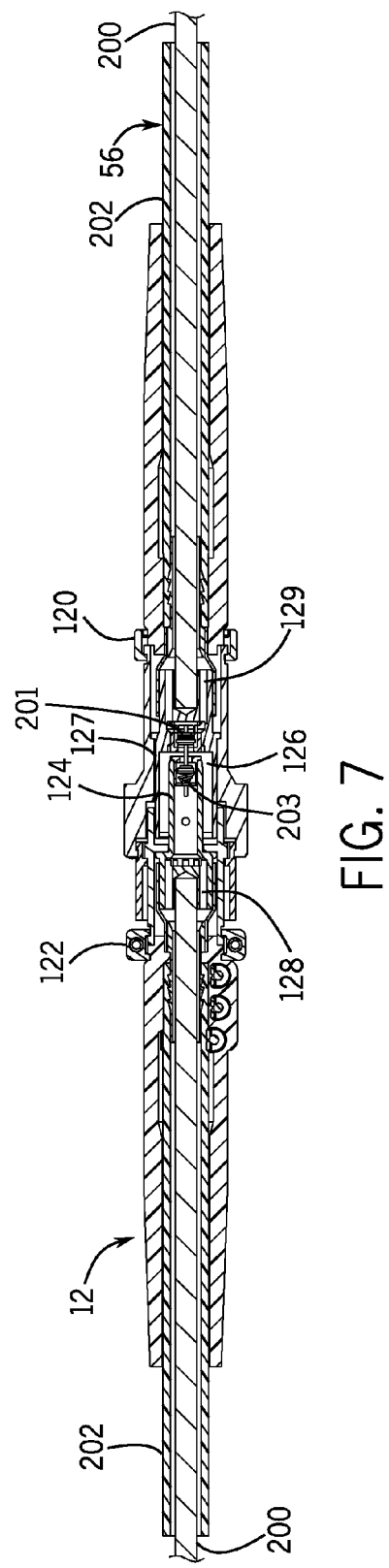

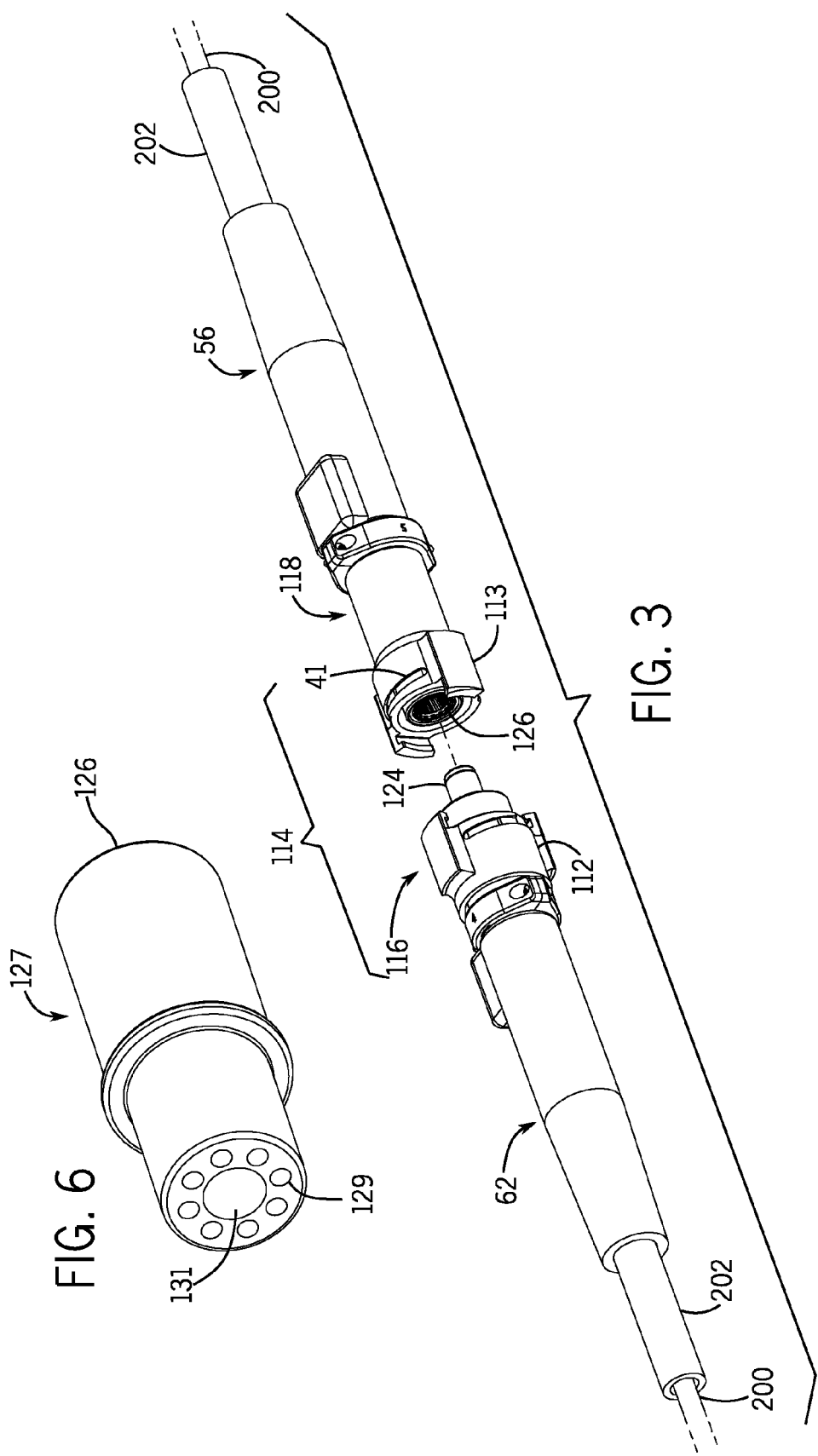

COOLED POWER CONNECTOR WITH SHUT OFF VALVE, INDUCTION HEATING SYSTEM, AND CABLE FOR USE WITH CONNECTOR

CROSS-REFERENCE TO RELATED APPLICATIONS

This application claims the benefit of U.S. Provisional patent application Ser. No. 61/715,089, filed on Oct. 17, 2012 entitled "Cooled Power Connector with Shut Off Valve, Induction Heating System, and Cable for use with Connector", which is incorporated herein by reference in its entirety.

FIELD OF THE INVENTION

The disclosed system is directed to a fluid cooled electrical connector with a corresponding valve, and is more particularly directed to a fluid cooled connector for use in an induction heating cable and corresponding system.

BACKGROUND

Induction heating systems apply an AC electric signal to a conductor adapted to produce a magnetic field, such as a loop or coil. The alternating current in the conductor produces a varying magnetic flux. The conductor is placed near a metallic object to be heated so that the magnetic field passes through the object. Electrical currents are induced in the metal by the magnetic flux, and the metal is in turn heated by the flow of electricity induced in the metal by the magnetic field.

Because high current AC signals are transmitted through the cables in an induction heating system, it is necessary to cool the cables during operation to prevent overheating and damage to components. Air cooled systems can be used in heating applications of about 400 degrees or less. When the application is intended to heat the metal to a temperature over 400 degrees, liquids are typically used to cool the system.

Liquid coolants provide a higher degree of thermal transfer away from the cables, but are difficult to use for a number of reasons. For example, liquid coolants require additional equipment, including cooling units with pumps for circulating the coolant. More importantly, routing the coolant through the system and adjacent to the electrical wires can be difficult, particularly in high power applications.

Present systems typically use T-fittings for connecting a hose from a cooling unit to a cable bundle that includes both the current-carrying electrical cable, and the cooling fluid. Here, when extensions are required, a jumper is used to route the fluid flow around the connection area, as described in U.S. Pat. Nos. 8,038,931, and 7,696,458 which are hereby incorporated by reference in their entirety for the description of an induction heating system and associated cooling system. While this system is effective in providing appropriate cooling of the cable, the bends in the T-fitting undesirably restrict coolant flow, and there are hot spots where the connections are made.

Other systems run coolants directly through the electrical connection. These systems do not include a shut off or quick disconnect, and coolant drips out of the cables when they are disconnected, wasting coolant.

There is a need therefore for an improved electrical and fluid connector, and corresponding induction heating system that avoids the problems associated with current induction heating systems and cabling. The disclosed system addresses these and other issues.

SUMMARY OF THE INVENTION

In one aspect of the invention, an induction heating cable is disclosed comprising an electrical conductor for carrying heating power, a fluid conductor for carrying a coolant fluid to cool the electrical conductor, and a connector body. The connector body includes an electrical connector for connection to the electrical conductor, at least one aperture providing a fluid flow path through the connector body, and a valve moveable between an on position and an off position, wherein the fluid flow path is open when an electrical connection is made with the electrical connector and closed when the electrical connection is removed from the electrical connector. The connector body can include a socket for receiving a mating pin, and the valve can be a spring-loaded valve activated when the mating pin is received in the socket. The valve can be adapted to open a plurality of holes provided in the housing including the electrical connector when the pin is received in the socket.

In another aspect of the invention, an in-line connector for simultaneously providing an electrical and a fluid flow connection is disclosed. The in-line connector comprises a first connector body and a mating second connector body. The first connector body is adapted to receive and electrically connect to an electrical conductor at a first end, and includes an electrical conductor at the opposing end that is adapted to mate with a corresponding conductor in the mating connector. The first connector body further comprises apertures providing a fluid flow path through the first body. The second connector body is adapted to electrically connect to an electrical conductor at a first end, and includes the mating connector sized and dimensioned to mate with the electrically conductive end of the first conductor at the opposing end. The second connector comprises at least one aperture that selectively provides a fluid flow path through the body of the second connector. When the first connector body is coupled to the second connector body, the aperture in the first body align with the aperture in the second body, and a valve is activated to allow fluid flow between the aperture in the first body and the aperture in the second body, and when the first connector body is disconnected from the second connector body, the valve is deactivated and prevents fluid flow between the first and second connector bodies.

In another aspect of the invention, a quick disconnect connector is disclosed for providing an in-line electrical and fluid connection. The connector comprises a first connector body and a second connector body. The first connector body comprises a socket at a first end, an electrical receptacle for receiving an electrical conductor at an end of a cable at a second end, and one or more hole extending through the body to direct fluid flow through the body. A valve is provided in the body for selectively opening or closing the hole. The second connector body comprises a pin sized and dimensioned to be received in the socket of the first connector body, a second electrical receptacle for receiving an electrical conductor, and a second plurality of holes for directing fluid through the second connector body. When the pin is received in the socket, the valve is activated to open the plurality of holes in the second connector body and to allow fluid to flow through the socket, the pin, and through the first and second plurality of holes, and to provide both an electrical connection and a fluid flow connection.

A second valve can be provided, so that when the valves are closed, fluid flow is stopped within both connectors.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 2 is a perspective view of an induction heating cable and corresponding induction heating extension cable interconnected through an in-line quick disconnect connector;

FIG. 3 is a perspective view of the induction heating cables of FIG. 2 in a disconnected state;

FIG. 6 is a perspective end view of a female connector housing of the cable of FIG. 5;

FIG. 7 is a cutaway side view of the cables of FIGS. 4 and 5 as connected.

DESCRIPTION OF THE DISCLOSED SYSTEM

Figure 1:
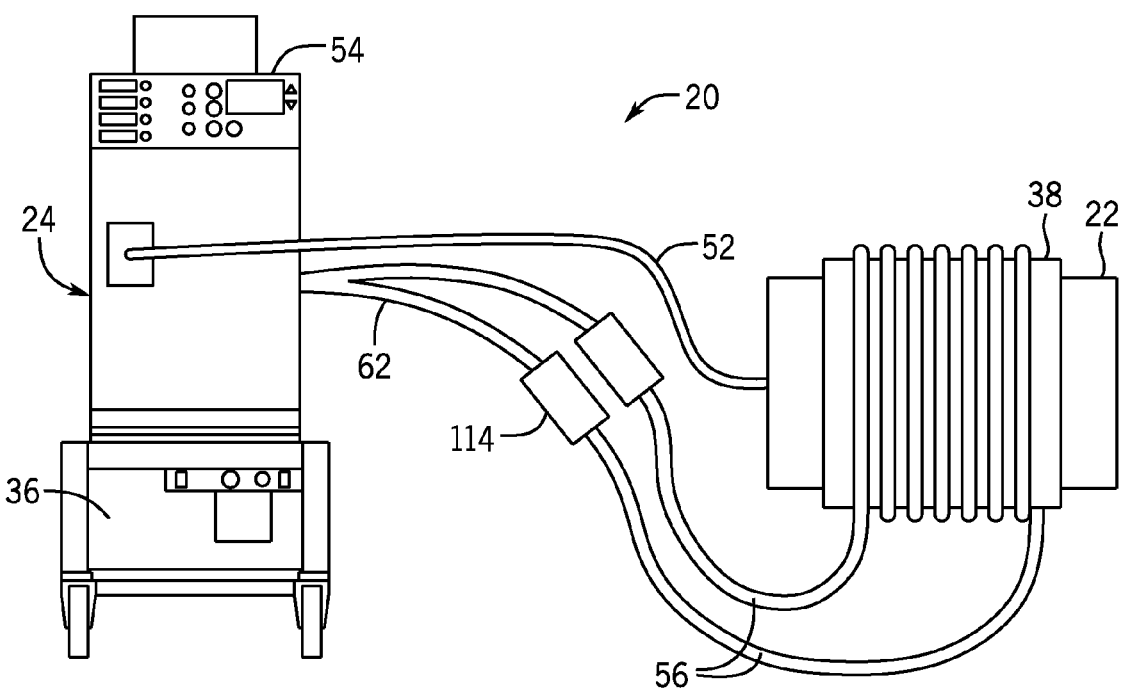
FIG. 1 is a perspective view of an induction heating system and corresponding cables.

Referring generally to FIG. 1, an exemplary induction heating system 20 for applying heat to a workpiece 22 is illustrated. In the illustrated embodiment, the workpiece 22 is a circular pipe. Referring first to FIG. 1, the induction heating system 20 comprises a power system 24, a fluid cooling unit 36, a fluid-cooled induction heating cable 56, a fluid-cooled power output cable 62, and, optionally, a temperature feedback device (not shown). The power source 24 produces a flow of AC current through the fluid-cooled induction heating cable 56, and a flow of cooling fluid through the fluid-cooled induction heating cable 56. In FIG. 1, the fluid-cooled induction heating cable 56 has been wrapped around the workpiece 22 several times to form a series of loops. An extension cable 62 can extend the effective distance of the fluid-cooled induction heating cable 56 from the power system 24. In the illustrated embodiment, the extension cable 62 couples the fluid-cooled induction heating cable 56 to the power system 24 both electrically and fluidicly. Both electrical power and fluid are carried through the connection 114, which provides a quick disconnect to simultaneously disconnect both the fluid flow, and the electrical connection, as described more fully below. Alternatively, an air-cooled extension cable, an air-cooled induction heating cable, or an air-cooled induction heating blanket can be used.

In operation, the AC current flowing through the fluid-cooled induction heating cable 56 produces a magnetic field which, in turn, induces a flow of current and subsequently heat in the workpiece 22. The fluid flowing through the fluid-cooled induction heating cable 56 also acts to protect the fluid-cooled induction heating cable 56 from heat damage due to the temperature of the workpiece 22 and electrical current flowing through the conductors in the fluid-cooled induction heating cable. The optional temperature feedback device can provide the power system 24 with temperature information from the workpiece 22, and connect to the power source 24 through, for example, a cable 52.

The power source 24 can include a controller or control panel 54, and a cooling unit 36, which can be mounted on a wheeled cart as shown. The power source 24 can be an inverter power supply of the type known in the art that produces the AC current that flows through the fluid-cooled induction heating cable 56. One such inverter power source is disclosed in U.S. Pat. No. 8,038,931, which is hereby incorporated by reference for its description of the inverter power supply. The controller or control panel 54 can be programmable, and can be operable to control the operation of the power source 24. In the illustrated embodiment, the controller 54 controls the operation of the power source 24 in response to programming instructions and optionally the workpiece temperature information received from the temperature feedback device. The cooling unit 36 is operable to provide a flow of cooling fluid through the fluid-cooled induction heating cable 56 to remove heat from the fluid-cooled induction heating cable 56. Although the controller 54 is shown here included within the housing of power source 20, the controller can be provided in a separate housing. The cooler 36 can also be included within the housing of power source 20.

Referring now to FIGS. 2 and 3, an induction heat cable 56 coupled to an extension cable 62 is shown. The cables 56 and 62 each comprise an electrical conductor 200 that is received in a hose 202. Electrical current is transmitted from the power source 24 through the conductor 200, while fluid, and particularly coolant, flows from cooler 36 through the hose 202. The connector assembly 114 provides both an electrical connection and a fluid flow path between mating connectors 116 and 118, respectively. When the mating connectors 116 and 118 are properly aligned and connected, electrical current flows through electrical conductors 200. The connection also activates one or more valve, which allow fluid to flow through the bodies of the mating connectors 116 and 118, and through hoses 202 to cool the corresponding electrical conductors 200. Fluid flow can be, for example, through apertures in the bodies of the mating connectors 116 and 118. The conductor 200 can be a multi-conductor litz wire, and the hose can be constructed of silicon, although other constructions are also possible.

One embodiment of a connector as described above is shown in FIGS. 2 through 7. As shown here, the connector 114 comprises a male connector 116, here shown coupled to cable 62, and a female connector 118, here shown coupled to cable 56. Each of the connectors 116 and 118 is positioned within a twist lock coupling device 112 and 113, respectively, that may include cammed surfaces 111 for limiting rotation. Clamps 120 and 122 secure the twist lock coupling devices 112 and 113 to the respective cables, and are also provided to insulate mating connectors 124 and 126, described below. Connection 114 provides a quick disconnect in-line connector, which provides an electrical connection between the electrical conductors 200 in cables 56 and 62, and provides a fluid flow path between hoses 202, as described below.

Figure 4:
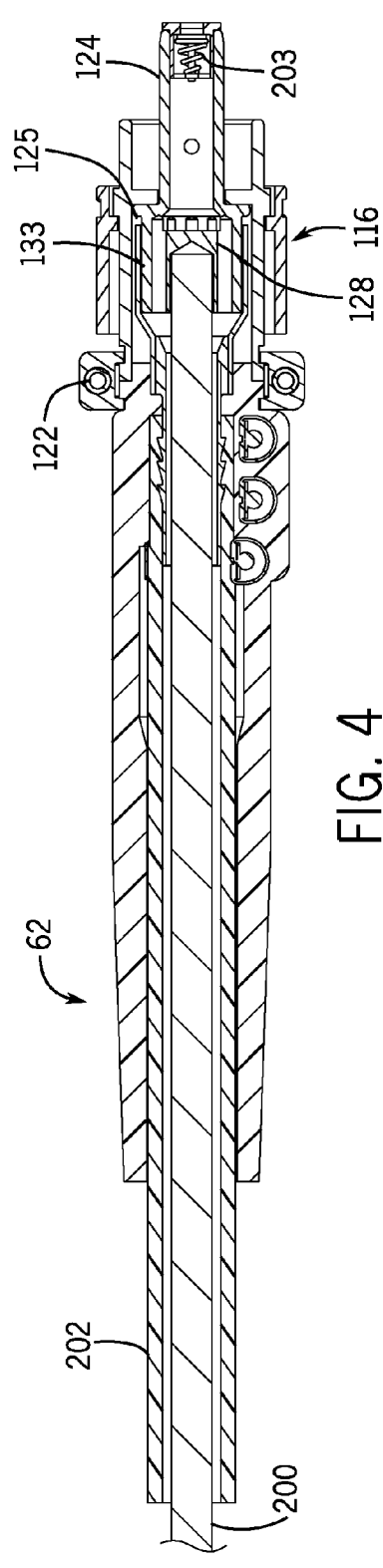
FIG. 4 is a cutaway side view of the extension cable of FIG. 2 with a male connector at the distal end.

Referring now to FIG. 3, in this exemplary embodiment, a pin 124 extends from one end of male connector 116, and is received in a corresponding mating socket 126 in female connector 118. The connection between pin 124 and socket 126 results in an electrical connection, providing an electrical path between the electrical conductors 200. Apertures through the bodies of the connectors also provides a fluid path for fluid flowing through the sections of hose 202, as described below Referring now to FIGS. 4 and 5, cutaway side views of the heat and extension cables 56 and 62 and corresponding male connector 116 and female connector 118 are shown. Referring first to FIG. 4, the male connector 116 includes a male connector body 125 constructed, at least in part from, or including or coupled to, an electrically conductive material such as metal. The male connector body 125 includes a hollow pin 124 extending from a first end, and an electrical receptacle 128 sized and dimensioned to receive the electrical conductor 200 formed in an opposing end. Holes or apertures 133 extend through the male connector body 125 to direct fluid flow through the male connector body 125, and then through the pin 124 at the opposing end. The electrical conductor 200 can be connected to the electrical receptacle 128 in the male connector body by soldering, crimping, or setscrews, by way of example. Various other methods of connecting an electrical conductor 200 to a receptacle will be apparent to those of skill in the art.

Figure 5:
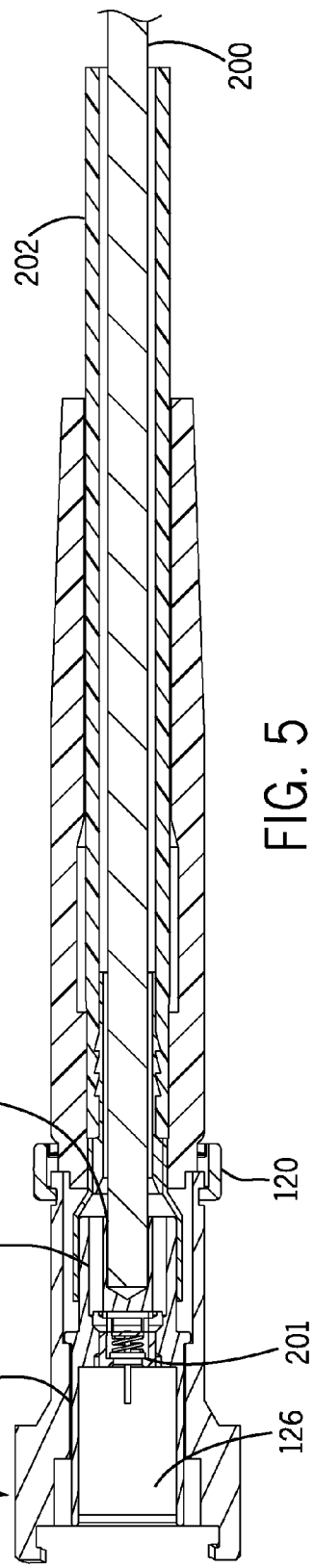
FIG. 5 is a cutaway side view of the induction heating cable of FIG. 2 with a female connector at the distal end.

Referring now also to FIG. 5, the female connector 118 comprises a female connector body 127 constructed, at least in part, of an electrically conductive material such as metal. The connector body 127 includes an electrical socket 126 sized and dimensioned to mate with the pin 124 in the male connector 116 at one end, and an electrical receptacle 131 formed in the opposing end, sized and dimensioned to receive electrical conductor 200. Electrical conductor 200 is connected to the connector body 127 by, for example, soldering or crimping the cable to the receptacle 131. Referring now also to FIG. 6, holes or apertures 129 extend through the connector body 127, through walls of the electrical receptacle 131, and toward a spring-activated valve 201 that is contained within the body 127. Again various methods of connecting the electrical conductor 200 to the electrical receptacle 131 will be apparent.

Referring now to FIGS. 4, 5, and 7, when the male connector 116 is received in the female connector 118, and pin 124 is received in socket 126, an electrical connection is formed coupling the electrical conductors 200 in the cable 56 and extension cable 62. The connection between pin 124 and socket 126 also activates the spring-actuated valves 201 and 203, opening a fluid flow path through valve 201 into the apertures 129 in the female connector 118, through socket 126, into pin 124, through valve 203, and through the holes 133 in the male connector body 125, and along the fluid flow path along hoses 202 corresponding to cable 56 and 62, respectively. Conversely, when the male connector 116 and female connector 118 are disconnected, the spring-activated valves 201 and 203 are deactivated, stopping the flow of fluid. Although the valves 201 and 203 are shown here positioned between the socket receptacle 131 and socket 126, and at the end of pin 124, the valves 201 and 203 can be positioned elsewhere along the fluid path where it is possible to close fluid flow paths or apertures and to stop fluid flow.

Although a specific embodiment of an induction heating cable and connector have been described above, it will be apparent that various modifications could be made while still meeting the objectives of the invention. For example, although fluid if described above as flowing from the male to the female connector, it will be apparent that the male and female connectors could be reversed, and fluid could flow from the female through the male connector. Additionally, although valves are shown in both connectors, it will be apparent that valves can be provided in either or both sides of the connector.

Additionally, although fluid flow is shown through the pin and socket connection of the cables, holes or apertures could also be drilled through the sidewalls of the corresponding housings, and fluid could be directed around the electrical connection. Fluid could also be directed through a center of the connector, and the electrical wires could be routed around the outside of the connector, around the fluid path. In alternate embodiments, other types of valve systems could also be used. For example, a ball valve could be provided within the connector and activated or deactivated, for example, by rotating and disconnecting the mating conductors. Additionally, although the connector 114 is shown connecting two external cables, a similar connector could be mounted or coupled to the housing of the power source 24, such that fluid from cooling unit 36 and electrical connections could be made simultaneously at the power source 24.

Although the system has been described above for use with an induction heating system and corresponding induction heat cable, it will be apparent that the connectors disclosed herein can be used in any number of applications where it is desirable to simultaneously connect and disconnect electrical and fluid circuits simultaneously.

Further, although a specific electrical connection including a pin and socket is described above, it will be apparent that various other types of electrical connections could be used to provide mating electrical connections.

The disclosed connector provides a number of advantages over prior art systems. For example, liquid, air or other fluid coolants flowing through the connector removes heat from the electrical connection, and corresponding pressure drops. Additionally, the connector minimizes the number of direction changes in coolant flow as compares to prior art systems that relied on T-fittings. Because the connectors are typically constructed of conductive materials like metal, plastic breakage is eliminated. The resultant connection is smaller, and provides a low profile, which is helpful in tightly-spaced installations. Other advantages will be evident to those of skill in the art.

It should be understood that the methods and apparatuses described above are only exemplary and do not limit the scope of the invention, and that various modifications could be made by those skilled in the art that would fall under the scope of the invention. To apprise the public of the scope of this invention, the following claims are made.

I claim:

1. An in-line connector for simultaneously providing an electrical and a fluid flow connection, the inline connector comprising:
   a first connector body comprising an electrically conductive material including a receptacle for receiving and electrically connecting to an electrical conductor at a first end, and having an electrically conductive opposing end, the first connector body comprising a fluid flow path extending through the connector body and providing a fluid flow path to the opposing end of the body of the first connector;
   a second connector body comprising an electrically conductive material including a receptacle for receiving an electrical conductor at a first end, and having an electrically conductive opposing end sized and dimensioned to mate with the electrically conductive end of the first connector body, the second connector body comprising a fluid path through the body of the second connector, and
   a valve coupled to one of the first and second connector body and activated when the first connector body is mated to the second connector body;
   wherein when the electrically conductive opposing end of the first connector body is connected to the electrically conductive opposing end of the second body, the valve is activated and fluidly connects the fluid path in the first connector body to the fluid path in the second connector body, and when the first connector body is disconnected from the second connector body, the valve is deactivated and prevents fluid flow between the first and second connector bodies.

2. The in-line connector of claim 1, further comprising a second valve, wherein the first valve is adapted to stop fluid flow through the fluid path in the first body, and the second valve is adapted to stop fluid flow through the second body.

3. The in-line connector of claim 1, wherein the electrically conductive end of the first connector body comprises a tubular pin and the electrically conductive end of the second connector body comprises a socket sized and dimensioned to receive the tubular pin.

4. The in-line connector of claim 3 wherein the valve is a spring activated valve coupled to the distal end of the pin, the valve being activated when the pin is received in the socket.

5. The in-line connector of claim 4, wherein the fluid path in the first connector body extends through the pin and the fluid path flow in the second connector body extends through the socket.

6. The in-line connector of claim 5, wherein the fluid path through the first connector body extends though the pin though an aperture in fluid communication with the pin and extending to the end of the connector body opposing the pin.

7. The in-line connector of claim 5, wherein the fluid flow path in the second connector body extends through the socket and through an aperture in fluid communication with the socket and extending through the second connector body.

8. The in-line connector of claim 1, wherein the valve is a spring-activated valve coupled to the distal end of the socket, the valve being activated when the pin is received in the socket.

9. A quick disconnect connector for providing an in-line electrical and an in-line fluid connection in an induction heating cable, the connector comprising:
a first connector body comprising a socket at a first end, the socket electrically connected to an electrical receptacle for receiving an induction heating cable at an end of a cable at a second end, at least one fluid path defined in the body and extending through the body to direct fluid flow through the body;
a second connector body comprising a pin sized and dimensioned to be received in the socket of the first connector body, the pin electrically connected to a second electrical receptacle for receiving an induction heating cable, the second connector body comprising a second fluid path defined in the second connector body for directing fluid through the second connector body; and
a spring-activated valve coupled to one of the pin and the socket for selectively opening or closing the fluid path wherein when the pin is received in the socket, the pin is connected to the socket to provide an electrical connection connecting an induction heating cable coupled to the first connector body to an induction heating cable coupled to the second connector body, and the valve is activated to open the fluid path between the first and second connector bodies to allow fluid to flow through the socket, the pin, and through the first and second fluid path to hoses connected to the first and second connector bodies, wherein the connector provides both an electrical connection and a fluid flow connection.

10. The quick disconnect connector of claim 9, further comprising a second spring-activated valve coupled to the other of the pin and the socket, the valve activated by interconnection of the pin and the socket to open the fluid path in the first connector body.

11. The quick disconnect connector of claim 9, wherein each of the fluid path and the second fluid path comprises an aperture.

12. The quick disconnect valve as recited in claim 9, wherein the fluid path and the second fluid path each comprises an aperture formed in the corresponding connector body and providing a fluid path from the corresponding pin and socket to an opposing end of the corresponding connector body.

13. The quick disconnect valve as recited in claim 9, wherein the pin comprises a tube, and wherein the fluid flows from the first connector body to the second connector body through the pin in the first connector body and the socket in the second connector body.

14. An induction heating cable, comprising:
a fluid conductor for carrying a coolant fluid;
an electrical conductor for carrying heating power, the electrical conductor provided in the fluid conductor wherein a coolant fluid in the fluid conductor cools the electrical conductor;
a connector body coupled to the electrical conductor and the fluid conductor and comprising:
an electrical receptacle coupled to the electrical conductor and an electrical connector configured to be mated to a mating electrical connector to provide an electrical connection;
a fluid flow path extending through the connector body and to the fluid conductor; and
a valve moveable between an on position and an off position, the valve being selectively opened to provide fluid flow through the fluid flow path and the fluid conductor when a mating connector body is coupled to the connector body forming an electrical connection, the fluid flow path being opened when a mating connector is coupled to the electrical connector and closed when the mating connector is removed from the electrical connector, wherein both electrical and fluid flow are enabled by the connection.

15. The induction heating cable as recited in claim 14, wherein the electrical connector comprises at least one of a socket and a pin for receiving the other of a socket and pin provided in the mating connector body.

16. The induction heating cable as recited in claim 15, wherein the valve comprises a spring-loaded valve activated when the at least one of the pin and socket is received in a mating socket or pin.

17. The induction heating cable as recited in claim 16, wherein the fluid path comprises a plurality of apertures extending through the connector body and the valve is adapted to open a path through the plurality of apertures when the mating socket or pin is received in the at least one of the pin and socket.

18. The induction heating cable as recited in claim 15, wherein the fluid flow path extends through the electrical connector.

19. The quick disconnect valve as recited in claim 14, wherein at least a portion of the connector body comprises an electrically conductive material.

* * * * *